United States Patent [19]
Guzman et al.

[11] Patent Number: 6,103,285
[45] Date of Patent: Aug. 15, 2000

[54] METHOD FOR IMPROVING THE SOFTNESS OF RAISINS

[75] Inventors: Miguel A. Guzman, Aptos, Calif.; Erin Hegarty, Cambridge, Mass.

[73] Assignee: Mariani Packing Company, Inc., Danville, Calif.

[21] Appl. No.: 09/192,881

[22] Filed: Nov. 16, 1998

[51] Int. Cl.[7] ............................... A23L 1/212; A23B 7/16
[52] U.S. Cl. .................. 426/302; 426/102; 426/304; 426/305; 426/615; 426/640; 426/506; 426/519
[58] Field of Search ................................. 426/102, 293, 426/302, 304, 305, 331, 333, 615, 639, 640, 506, 519, 281

[56] References Cited

U.S. PATENT DOCUMENTS

| | | | |
|---|---|---|---|
| 4,696,824 | 9/1987 | Meczkowski et al. | 426/102 |
| 4,917,910 | 4/1990 | Hseih et al. | 426/302 X |
| 4,946,694 | 8/1990 | Gunnerson et al. | 426/102 X |
| 5,000,971 | 3/1991 | Hsieh et al. | 426/302 |
| 5,188,861 | 2/1993 | Mazin et al. | 426/640 |
| 5,286,505 | 2/1994 | Hartson et al. | 426/321 X |
| 5,364,643 | 11/1994 | Morimoto et al. | 426/302 X |
| 5,439,692 | 8/1995 | Guzman et al. | 426/302 X |

*Primary Examiner*—Milton Cano
*Attorney, Agent, or Firm*—Hopkins & Carley; Donald J. Pagel

[57] ABSTRACT

A method for improving the softness of raisins in which the raisins are placed inside of a sealed, heated vessel with an excess of glycerin and allowed to stand for approximately sixteen hours. The method comprises the steps of increasing the moisture content of a quantity of raisins is increased to yield a quantity of hydrated raisins; applying a coat of glycerin to the hydrated raisins to yield a quantity of coated raisins; forming a six foot high column of the coated raisins inside of a heated vessel with an excess of glycerin; keeping the coated raisins inside the heated vessel for approximately sixteen hours; and periodically mixing the coated raisins with the excess glycerin during the sixteen hour period.

18 Claims, 2 Drawing Sheets

METHOD FOR IMPROVING THE SOFTNESS OF RAISINS

BACKGROUND OF THE INVENTION

1. Technical Field

The present invention relates to the processing of dried fruits to improve their softness retention characteristics, and more particularly to the infusion of raisins with glycerol.

2. Background Information

It is well-known that raisins and other dried fruits lose enough moisture over time to reduce their softness characteristics beyond desirable limits. This problem is especially pronounced when the dried fruit is mixed with a dry cereal, such as corn or bran flakes. Many methods have been disclosed for minimizing this problem. For example, U.S. Pat. No. 5,439,692, discloses a method in which glycerol is infused into raisins under vacuum in order to improve the softness retention characteristics of the raisins. A problem with this technique is that it requires an apparatus capable of achieving and maintaining a reduced pressure of about 35 mm of Hg. The reduced pressure requirement adds to the cost and complexity of the process for treating dried fruit with glycerol. What is needed is a simpler and less expensive method of infusing dried fruit with glycerol.

BRIEF SUMMARY OF THE INVENTION

Briefly, the present invention comprises a method for infusing glycerol into a dried fruit, such as raisins, that doesn't require a reduced pressure infusion apparatus. In the method of the present invention, the moisture content of a quantity of raisins is increased by soaking the raisins in warm water. A coating of glycerin is added to the hydrated raisins and the glycerin coated raisins are transferred to an infusion vessel. A column of the coated raisins that is at least approximately six feet in height is formed inside of the infusion vessel. While the column of the coated raisins is in the vessel, the vessel is maintained at approximately normal atmospheric pressure, at a temperature above approximately 100° F., for a period of time that is greater than about fifteen hours. This period of time is referred to as the infusion period. Periodically during the infusion period, the coated raisins are mixed for short periods of time (e.g. three minutes). For example, the raisins might be mixed during three separate three minute intervals during the infusion period. After the infusion period is over, the raisins are removed from the vessel, washed with water and dried.

DETAILED DESCRIPTION OF THE INVENTION

Figure 1:
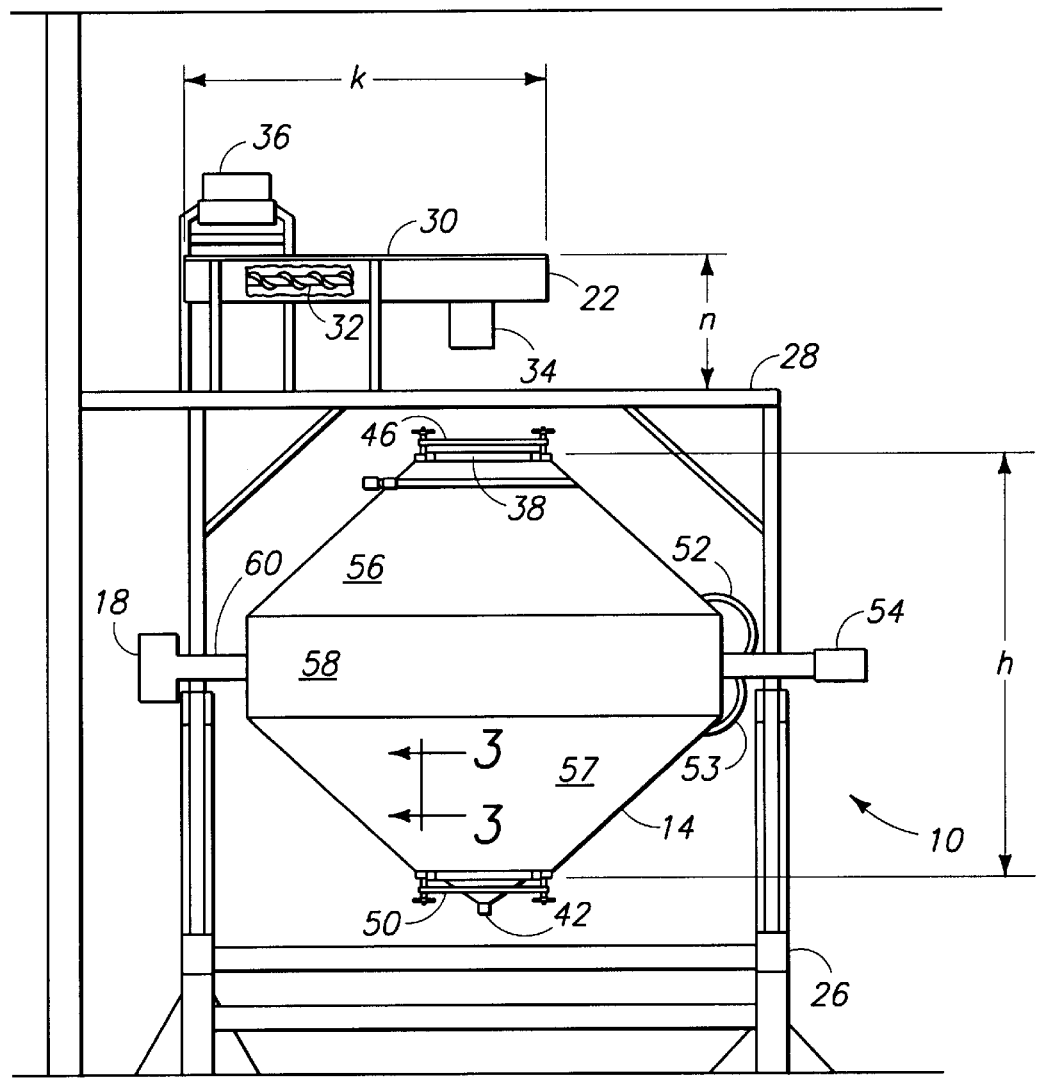
FIG. 1 is a front view of a raisin infusion apparatus according to the present invention.

FIG. 1 illustrates a raisin infusion apparatus 10 for infusing raisins with glycerol. Glycerol is an edible three-carbon trialcohol having the formula $HOCH_2CHOHCH_2OH$. Glycerol is also referred to as glycerin or glycerine. The apparatus 10 comprises an infusion vessel 14, a rotation mechanism 18, a glycerol mixing mechanism 22 and a frame 26.

A catwalk 28 is positioned above the vessel 14 to provide a place where an operator can stand to monitor the loading of raisins into the vessel 14. The catwalk 28 also provides support for the mixing mechanism 22 and other mechanical equipment. The mixing mechanism 22 comprises a mixing trough 30, an auger 32 and a slide 34.

A weigh belt 36 weighs the hydrated raisins and delivers them to the mixing trough 30 where glycerol is mixed with the raisins. The rotational action of the auger 32 mixes the raisins and the glycerol and conveys the raisins along the trough 30 to the slide 34. Generally, raisins are moved through the trough 30 at a rate of approximately eight short tons of raisins per hour. The slide 34 directs the raisins and excess glycerol into the infusion vessel 14 through the opening 38.

The infusion vessel 14 is an air-tight multisided drum comprised of stainless steel, and which has a capacity of approximately 20,000 pounds of raisins. The infusion vessel 14 has the vertical inside height "h" of approximately nine feet. One side of the vessel 14 (preferably the top side) includes a large opening 38 that is used for adding and removing raisins to and from the vessel 14. An opposite side (preferably the bottom side) includes a smaller opening 42 which is used for cleaning purposes. The opening 38 is covered with a water and air-tight lid 46 and the opening 42 is covered with a water and air-tight lid 50, both of which are preferably bolted into place.

Figure 3:
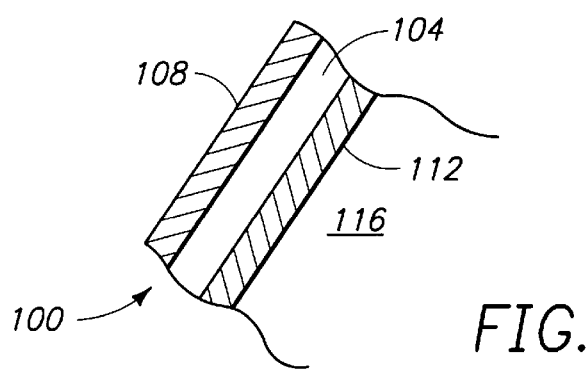
FIG. 3 is a cross-sectional view taken along the line 3—3 of FIG. 1.

The vessel 14 is constructed from two layers of stainless steel with a cavity positioned between the two layers (see FIG. 3). The cavity provides a space for warm water to flow around the circumference of the vessel 14, so as to warm the vessel 14. An inlet hose 52 and an outlet hose 53 provide an inlet and outlet for the warm water respectively. A water valve 54 controls the inflow and outflow of water to the hoses 52 and 53. The two-layer construction of the vessel 14 allows water to flow completely around the vessel 14 in an upper section 56 and a lower section 57, but not in a middle section 58. Another hose (not shown) connects the sections 56 and 57 so that water can flow between the two sections.

The rotation mechanism 18 allows the vessel 14 to be rotated 360 degrees about a horizontal axle 60. The frame 26 is comprised of stainless steel and functions to support the vessel 14 and the loading mechanism 22. Additionally, the frame 26 should be able to support at least thirty thousand pounds in the preferred embodiment. The mixing trough 30 has a length "k" of eight to twelve feet and which preferably provides at least approximately eight feet of length in which the raisins and glycerol are mixed before being delivered into the vessel 14. The top of the mixing trough 30 is positioned at a height "n" above the catwalk 28. Preferably, "n" is approximately 2.7 feet. Several mixing vessels 14 can be positioned underneath the trough 30 at fixed intervals. The vessel 14 has an inside height "h" (preferably approximately nine feet) measured from the inside of the lid 46 to inside of the lid 50.

Figure 2:
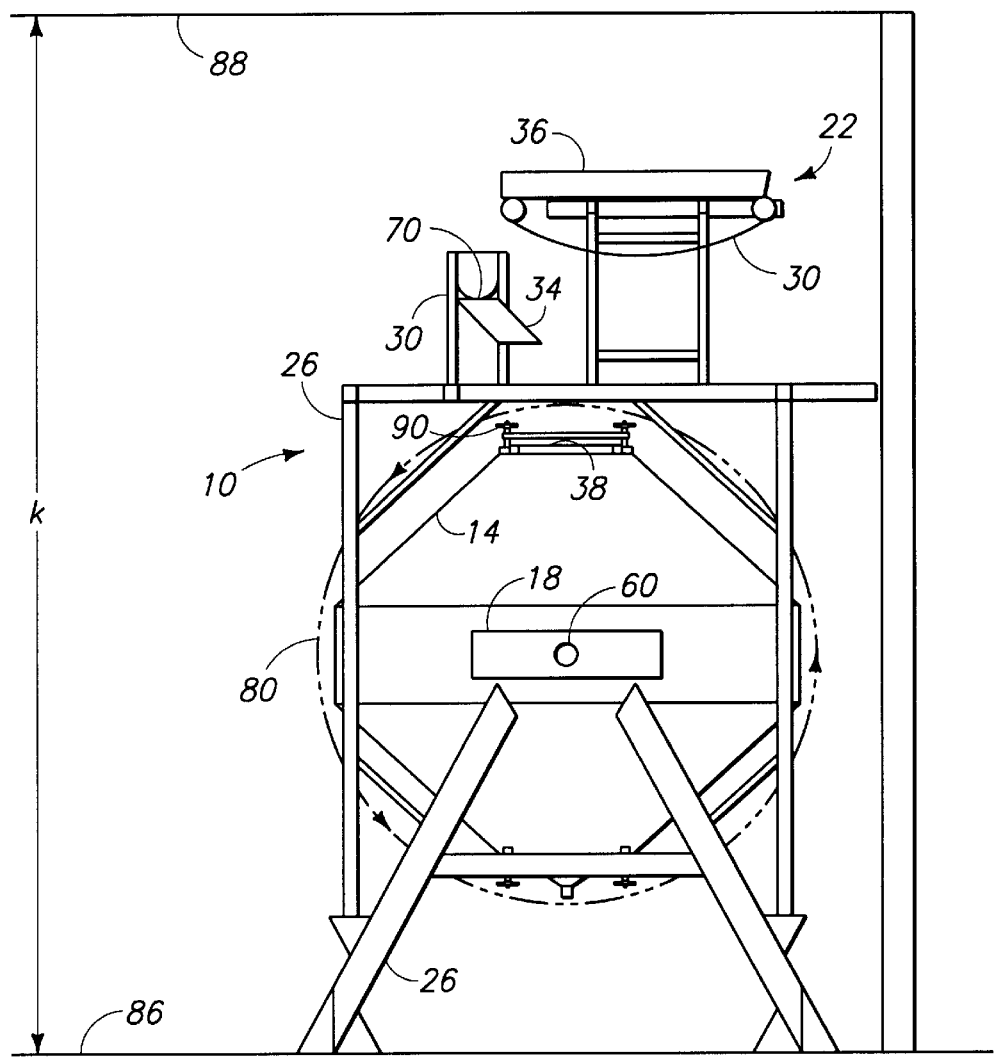
FIG. 2 is a side view of the raisin infusion apparatus according to the present invention.

FIG. 2 illustrates that raisins from the trough 30 are delivered to the slide 34 via a chute 70. The slide 34 is positioned to direct the raisins to the opening 38 in the vessel 14. The rotation mechanism 18 includes an hydraulic actuator which provides enough torque to the axle 60 to rotate the infusion vessel 14. A circle 80 (shown in phantom lines) illustrates that the vessel 14 can rotate 360 degrees about the axle 60. Typically, the axle 60 comprises a six inch stainless steel rod that extends entirely through the vessel 14. The apparatus 10 utilizes an overall height "k" of approximately twenty-two feet that extends from a floor 86 to an upper region 88.

FIG. 3 illustrates a piece 100 of the vessel 14 taken from section 57 (shown in FIG. 1). A cavity 104 is formed between an outer wall 108 and an inner wall 112. The cavity 104 provides the passageway for warm water to flow in, thereby providing a means for heating the vessel 14. This two layer construction extends around the entire circumference of section 57 so that warm water can flow on all sides of the vessel 14 encompassed by section 57. Similarly, section 56 of the vessel 14 is comprised of the two layer construction shown in FIG. 3 so that warm water can flow on all sides of the vessel 14 encompassed by section 56. A reaction chamber 116 comprises the space enclosed by the inner wall 112 (i.e. the chamber 116 is the inside of the vessel 14).

Referring to FIGS. 1 through 3, the method of improving the softness of raisins can be explained. In a first step, the moisture content of raw raisins is increased from approximately 9–14% to 20–24%. This is done by immersing the raw raisins in warm water at a temperature of approximately 130–180° F. for one to two minutes to yield the hydrated raisins, and then removing the excess water from the raisins. The warm hydrated raisins are then transported to the weigh belt 36, preferably by a conveyor belt. The weigh belt 36 weighs the raisins that pass in a given amount of time so that the weight of raisins per unit time is known (e.g. lbs/hr.). The raisins then enter the mixing trough 30 where they are coated with pure glycerin that has been heated to approximately 160–180° F. The amount of glycerin used is approximately 18 to 23% of the weight of the raisins being processed, and preferably about 22%. The proper amount of glycerin to use is automatically calculated from the weight of raisins per unit time provided by the weigh belt 36. The warm glycerin can be mixed with the raisins by any number of techniques, such as by spraying the glycerin on the raisins, but preferably, the warm glycerin is mixed with the raisins using the mixing auger 32. The mixing auger 32 runs longitudinally along the trough 30 as is illustrated in FIG. 1.

The mixing auger mixes the raisins and glycerin and moves the raisins and excess glycerin along the trough 30. The raisins and excess glycerin are delivered into the reaction chamber 116 inside the vessel 14 via the slide 34 and the opening 38. The excess glycerin arises because not all of the glycerin added to the raisins in the mixing trough 30 (i.e. the 18 to 23% amount of glycerin) is immediately absorbed by the raisins. The glycerin that is not absorbed initially is the excess glycerin.

The quantity of raisins added to the vessel 14 is sufficient to create a column (pile) of raisins in the reaction chamber 116 that is at least six feet high, and preferrably nine feet high. It is believed that a six foot or higher column of raisins is important to the method of the present invention so as to create a head pressure that is high enough to facilitate the infusion process. The inside height "h" of the vessel 14 is sufficient to permit the six foot or higher column of raisins to be formed inside of the vessel 14, and preferably the column of raisins extends along the entire inside height "h". The term column of raisins simply refers to the orientation the pile of raisins assumes when the raisins are added to the vessel 14. It does not imply a symmetrical cylindrical column in the geometric sense.

Before the raisins are added to the vessel 14, the vessel 14 is heated to approximately 100–160° F. (preferably 130° F.) by warm water flowing in the cavity 104. After the raisins are added to the vessel 14, the lid 46 is secured in place, preferably with a bolt-type mechanism 90. The raisin/glycerin mixture is tumbled soon after it is added to the vessel 14 by continuously rotating the vessel 14 through the 360 degree circle 80 for several minutes. The vessel 14 is maintained at approximately 100–160° F. (preferably 130° F.) for an infusion period of approximately fifteen to twenty-four hours, during which time the vessel 14 is periodically subjected to several minutes of rotation. The rotation ensures mixing of the excess glycerin in the vessel 14 with the raisins in the column of raisins. Generally, at the end of a rotation cycle, the vessel 14 is positioned 180 degrees from its orientation before the rotation cycle was started (i.e. the top becomes the bottom). This ensures that the pressure effect of the six foot column of raisins is experienced equally by all of the raisins.

After the infusion period, the raisins are rinsed with water to remove the excess glycerin. Preferably, after the raisins are removed from the vessel 14, they are directed up an inclined conveyor belt so that the excess glycerin runs down the conveyor belt and is collected. At the top of the conveyor belt, the raisins enter a shaker where they are washed with a water spray so as to remove excess glycerin. The raisins are then dehydrated to reduce the moisture content to approximately 11–14% by weight. At this point the raisins are found to have absorbed glycerin in an amount of 12–16.5% by weight. Finally, the raisins are coated with vegetable oil, such as a medium chain triglyceride (MCT), available from companies such as Hulls America or Stephan Company, to reduce stickiness between the raisins. A preferred example of this process is given below.

EXAMPLE

Raw raisins with a moisture content of about 11–14% are dumped into a hopper, then metered into a rehydration tank where the raisins are submerged in hot water at a temperature of approximately 130 degrees F. The raisins stay inside the rehydration tank for 1 to 2 minutes. Once they exit they are blasted with air to remove unnecessary surface moisture. The combination of hot water immersion and air blast elevates the raisin moisture content to about 18 to 22%.

The warm rehydrated raisins are then mixed with pure glycerin, which has been heated to a temperature of 170 degrees F., at a ratio of 22 lbs. of glycerin for every 100 lbs. of processed raisins. The mixture of glycerin and raisins is loaded into an infusion vessel with a capacity of about 20,000 lbs. of product, through the top of the vessel. The vessel is preheated to approximately 130 degrees F. by warm water flowing in the sides of the vessel before the raisins are added. The top of the vessel is sealed and the heating of the vessel is continued during the entire duration of the infusion process (about sixteen hours). The mixture of glycerin and raisins form a column approximately nine feet high inside the vessel so that the head pressure will assist in the infusion process.

After the top of the vessel has been sealed, the infusion vessel is rotated for about 3 minutes to ensure proper mixture of the materials. The rotation is stopped with the top of the vessel pointing vertically upward. After about five hours, the vessel is rotated for another three minutes, but this time, the rotation is stopped with the top of the vessel pointing vertically downward. After about ten hours, the vessel is rotated for another three minutes, and this time the rotation is stopped with the top of the vessel pointing vertically upward. After about 16 hours of infusion time the wet glycerated raisins are unloaded from the vessel, rinsed with tap water and dehydrated in a 3 stage continuous belt dryer at a temperature of about 170 degrees F. in the first stage, 140 degrees F. in the second stage and 70 degrees F. in the third stage. The drying process takes place in about 60 minutes. The finished product presents a glycerin content of about 12 to 16.5% by weight and 11 to 14% moisture. As the glycerated raisins come out of the dryer they are sprayed with vegetable oil, preferrably MCT, at a ratio of 1 lb. per 100 lbs. of glycerated raisins.

In view of the description and example given above, the method of the present invention can be summarized as follows:

1. The moisture content of a quantity of raisins is increased to yield a quantity of hydrated raisins;
2. A coating of a humectant, such as glycerin, is added to the quantity of hydrated raisins to yield a quantity of coated raisins;
3. A column of the coated raisins that is at least approximately six feet in height, is formed inside of a vessel, and excess glycerin is present inside the vessel;
4. While the column of the coated raisins is in the vessel, the temperature of the vessel is maintained at a temperature above approximately 100° F. for a period of time that is greater than about fifteen hours. This period of time is referred to as the infusion period;
5. Periodically during the infusion period, the coated raisins are mixed for short periods of time (e.g. three minutes). For example, the raisins might be mixed during three separate intervals during the infusion period; and
6. After the infusion period is over, the raisins are removed from the vessel, washed with water and dried. The dried raisins may optionally be coated with a vegetable oil.

The method of the present invention has the advantage that less glycerin is required to attain the final glycerin concentration in the processed raisins. Typically, a reduction of 10–15% in glycerin usage is realized with the method of the present invention. Additionally, the raisins display a more uniform glyceration level when treated according to the present invention. The method of the present invention is also more amenable to automation than methods of the prior art.

In the description given above, a glyceration process for improving the softness retention characteristics of raisins has been provided. It should be appreciated that this same process can be used with other dried fruits, such as dried strawberries, dried cherries, dried blueberries or dried cranberries, to improve the softness retention characteristics of these other dried fruits.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

We claim:

1. A method for improving the softness of dried fruits comprising the steps of:
   a) applying a coat of a humectant to a quantity of dried fruit to yield a quantity of coated dried fruit;
   b) forming a column of the coated dried fruit inside of a vessel for operation at approximately normal atmospheric pressure and having a bottom and a top, the column having a height inside of the vessel of at least approximately six feet, and an excess of the humectant being present inside of the vessel; and
   c) maintaining the vessel at a temperature above ambient temperature for a period of time while the coated dried fruit is inside of the vessel, wherein the humectant is infused into the coated dried fruit and the softness of the coated dried fruit is improved.

2. The method of claim 1 wherein the humectant comprises glycerin.
3. The method of claim 1 wherein the dried fruit comprises raisins.
4. The method of claim 1 wherein the period of time is greater than approximately fifteen hours.
5. The method of claim 1 wherein the height is approximately nine feet.
6. The method of claim 1 further comprising the step of:
   d) rotating the vessel periodically during the period of time so that the excess of the humectant is thoroughly mixed with the coated dried fruit.
7. The method of claim 6 further comprising the step of:
   e) stopping the rotation of the vessel at a position where the top of the vessel is in the position occupied by the bottom of the vessel at the beginning of the rotation.
8. A method for improving the softness of raisins comprising the steps of:
   a) increasing the moisture content of a quantity of raisins to yield a quantity of hydrated raisins;
   b) applying a coat of a humectant to the quantity of hydrated raisins to yield a quantity of coated raisins;
   c) forming a column of the coated raisins inside of a vessel for operation at approximately normal atmospheric pressure, the column having a height inside of the vessel of at least approximately six feet, the vessel having a bottom and a top and an excess of the humectant being present inside of the vessel;
   d) maintaining the vessel at a temperature above ambient temperature for a first period of time while the coated raisins are maintained inside the vessel; and
   e) mixing the coated raisins with the humectant during at least a second period of time, the second period of time occurring during the first period of time and being less than the first period of time wherein the humectant is infused into the raisins and the softness of the raisins is improved.
9. The method of claim 8 wherein step "a" comprises soaking the raisins in warm water.
10. The method of claim 8 wherein step "b" comprises using an auger to mix the hydrated raisins with glycerin warmed to at least 160° F.
11. The method of claim 8 wherein the vessel comprises a stainless steel container having a space between an outside wall and an inside wall for allowing warm water to flow around the vessel.
12. The method of claim 8 wherein the first period of time is at least approximately sixteen hours.
13. The method of claim 8 wherein step "e" is accomplished by rotating the vessel.
14. The method of claim 8 wherein the height is approximately nine feet.
15. The method of claim 8 wherein the temperature is greater than or equal to approximately 100° F.
16. The method of claim 13 wherein the second period of time is approximately three minutes.
17. The method of claim 8 further comprising the steps of:
   f) removing the raisins from the vessel;
   g) rinsing the raisins with water;
   h) drying the raisins.
18. The method of claim 17 further comprising the step of:
   i) coating the raisins with vegetable oil.

* * * * *